United States Patent Office 3,234,275
Patented Feb. 8, 1966

3,234,275
N-MERCAPTO UREAS
Hugo Malz, Leverkusen-Wiesdorf, Günter Oertel, Cologne-Flittard, and Hans Holtschmidt, Cologne-Stammheim, Germany, assignors to Farbenfabriken Bayer Aktiengesellschaft, Leverkusen, Germany, a German corporation
No Drawing. Filed Nov. 14, 1962, Ser. No. 237,713
Claims priority, application Germany, Nov. 16, 1961, F 35,370
4 Claims. (Cl. 260—552)

The present invention relates to and has as its object new and technically interesting sulphenylated ureas and thioureas as well as a process for the production thereof. More specifically, this invention is concerned with compounds of the general formula:

$$R_1-S-N(R_2)-\overset{(S)O}{\underset{\parallel}{C}}-N(R_3)(R_4)$$

In this formula, $R_2$ stands for an optionally substituted aliphatic or aromatic hydrocarbon radical, $R_3$ and $R_4$ denote hydrogen or optionally substituted indentical or different hydrocarbon radicals and $R_1$ stands for an optionally substituted hydrocarbon radical or for the residue:

$$-N(R_5)(R_6)$$

wherein $R_5$ and $R_6$ mean hydrogen or optionally substituted indentical or different hydrocarbon radicals. $R_3$ and $R_4$ or $R_5$ and $R_6$ can, furthermore, in each case, together with the nitrogen atom connected with these radicals, form members of a heterocyclic ring system.

According to the present invention, the above compounds are obtained by the reaction of sulphenamides or diamino-monosulphides with molar amounts of isocyanates or mustard oils according to the following equation:

$$R_1-S-N(R_3)(R_4) + N=\overset{O(S)}{\underset{\parallel}{C}}-R_2 \longrightarrow R_1-S-N(R_2)-\overset{(S)O}{\underset{\parallel}{C}}-N(R_3)(R_4)$$

For the production of these new sulphenylated (thio)-ureas, molar mixtures of the above mentioned reaction components are heated—optionally in the presence of inert solvents or diluents such as, for example, ligroin, petroleum ether or aromatic hydrocarbons—to temperatures of about 40 to 50° C. In general, a weakly exothermic reaction then commences. In other cases, it might be necessary to heat the reaction mixture at 70 to about 150° C. for some time (about ½ to 1 hour) in order to complete the reaction. According to the solvents or diluents used and according to the nature of the reaction components used, the sulphenylated (thio)-ureas obtained precipitate from the reaction mixture in the form of colourless to yellow crystals or oils, or can be obtained by evaporation of the solution in almost quantitative yields. They are soluble, without decomposition, in many organic solvents and are completely stable, even on prolonged storage. The sulphenamides and diamino-monosulphides used as intermediate products in the inventive reaction are known from the literature.

The new compounds obtainable according to the present invention are suitable as active substances for plant protection agents, especially as herbicides and may be used for the control of undesired plant growth and the destruction of weeds. In the latter respect the inventive compounds may be applied to the same way and in the same quantities as the known herbicide N-(p-chlorophenyl)-N', N'-dimethylurea, is i.e. in the form of dusts in combination with borax, quartz sand, pumice grit or similar materials; the active ingredient may be used in concentrations between 1.5 to 40 kg. per ha. of soil to be treated depending on the height and dense occurrence of the weed to be killed.

The inventive compounds mentioned in the following table have been tested in respect of their herbicidal activity.

Aqueous dilutions of these compounds have been prepared by mixing the active ingredient with acetone as an auxiliary solvent, adding thereto a commercial emulsifier and diluting this premixture at last with water to the desired concentration as indicated above. Th herbicidal activity of the compounds can be seen from the following table. These tests employing aqueous solutions of the compounds were carried out 24 hours after sowing (pre-emergence and post-emergence respectively) and the evaluation occurred three weeks later. The arabic numerals given in the table are evaluation results, 0 meaning no effect and 5 meaning a total effect (plants not germinating or dying after germinating).

| Compound | Application | Quantity used in— | | Mfllet | Beet | Oats | Cotton | Wheat | Mustard | Tomatoes | Beans |
|---|---|---|---|---|---|---|---|---|---|---|---|
| | | Per-cent | Kg./ha. | | | | | | | | |
| 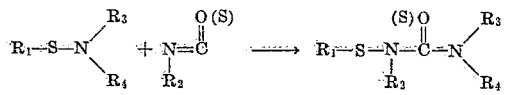 | Post-emergence | 0.4 | | 5 | 0 | 0 | 0 | 0 | 4 | 0 | 0 |
| | Pre-emergence | | 40 | 4 | 3 | 0 | 0 | 0 | 3 | | |
| $(C_2H_5)_2N-S-N(\underset{\text{Ph}}{})-\overset{S}{\underset{\parallel}{C}}-N(C_2H_5)_2$ | Post-emergence | 0.4 | | 5 | 2 | 2 | 0 | 2 | 5 | 4 | 2 |
| | Pre-emergence | | 40 | 1 | 4 | 5 | 1 | 2 | 5 | | |

| Compound | Application | Quantity used in— | | Millet | Beet | Oats | Cotton | Wheat | Mustard | Tomatoes | Beans |
|---|---|---|---|---|---|---|---|---|---|---|---|
| | | Percent | Kg./ha. | | | | | | | | |
| 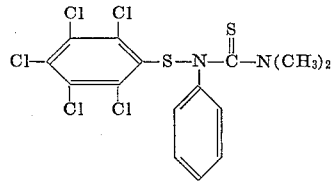 | Post-emergence<br>Pre-emergence | 0.4 | 40 | 5<br>3 | 4<br>5 | 0<br>1 | 2<br>0 | 2<br>1 | 4-5<br>4-5 | 4 | 2 |
| 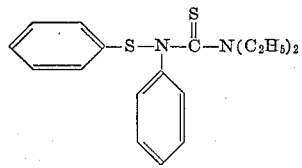 | Post-emergence<br>Pre-emergence | 0.4<br>0.2 | 40 | 4<br>3<br>4 | 4<br>3<br>5 | 2<br>0<br>1 | 0<br>0<br>0 | 2<br>0<br>2 | 4-5<br>4<br>5 | 2<br>0 | 4<br>3 |
| 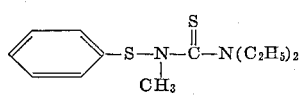 | Post-emergence<br>Pre-emergence | 0.4 | 40 | 3<br>4 | 1<br>5 | 1<br>2 | 0<br>1 | 0<br>1 | 1<br>3 | 1 | 2 |
| 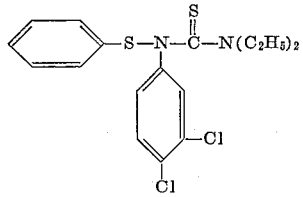 | Post-emergence<br>Pre-emergence | 0.4<br>0.2<br>0.1 | 40 | 5<br>5<br>4-5<br>2 | 4-5<br>4-5<br>4-5<br>5 | 1<br>0<br>0<br>1 | 1<br>0<br>0<br>0 | 2<br>1<br>0<br>1 | 3<br>2<br>2<br>4 | 1<br>0<br>0 | 2<br>1<br>0 |

The following examples are given for the purpose of illustrating the invention in more detail.

Example 1

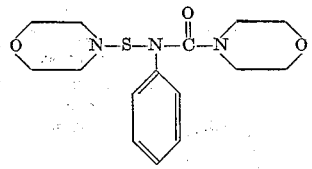

13 g. of dimorpholine sulphide are introduced at 50° C. into a solution of 8 g. of phenyl isocyanate in 20 ml. of ligroin. An exothermic reaction occurs, with the separation of colourless crystals which, upon prolonged stirring at 50° C., dissolve. The clear yellow solution is evaporated in a vacuum, whereupon 20 g. of the above compound remain in the residue in the form of a pale brown oil which, upon prolonged standing, solidifies to a wax-like mass.

In the same manner as described above there are obtained the following comopunds:

Example 2

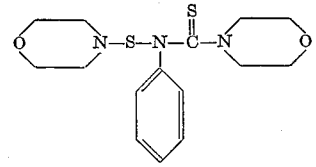

48.8 g. of dimorpholine sulphide are introduced at 50–70° C. into a solution of 27 g. of phenyl mustard oil in 50 ml. of ligroin. An exothermic reaction occurs. The temperature of the mixture is maintained in the stated range by cooling the reaction vessel with ice water.

After the introduction of the sulphide, there results a clear solution from which, upon further heating at 60° C., the reaction product separates in the course of an hour in the form of yellow crystals. After cooling to room temperature, the crystals are filtered off with suction and dried in a vacuum. There are obtained 60 g. (90% of the theoretical yield) of the above compound in the form of yellow crystals of melting point 126° C.

| Formula | | Physical properties |
|---|---|---|
| 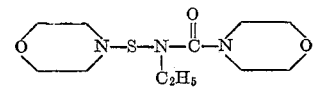 | | Brown, wax-like mass. |
| 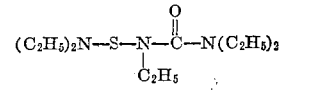 | B.P.$_{0.1}$: 75° C | Yellow oil. |

In analogous manner there are obtained the following compounds:

| Formula | | Physical properties |
|---|---|---|
| ⟨H⟩N—S—N(C₆H₃Cl₂)—C(=S)—N⟨H⟩ (2,4-dichlorophenyl) | | Yellow oil. |
| ⟨H⟩N—S—N(C₆H₄-SCH₃)—C(=S)—N⟨H⟩ | | Red-brown oil. |
| ⟨H⟩N—S—N(C₆H₃Cl₂)—C(=S)—N⟨ ⟩ | M.P. 88° C.. | Yellow crystals. |
| $(C_2H_5)_2N-S-N-\overset{S}{\overset{\|}{C}}-N(C_2H_5)_2$ with $C_6H_4NO_2$ | | Yellow oil. |
| ⟨H⟩N—S—N(C₆H₄-OC₂H₅)—C(=S)—N⟨H⟩ | M.P. 99° C.. | Light yellow crystals. |
| ⟨O⟩N—S—N(C₆H₄NO₂)—C(=S)—N⟨O⟩ | | Light yellow oil. |

Example 3

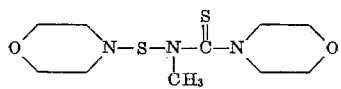

40.8 parts of dimorpholine sulphide are introduced, with cooling, at 70° C. into 30 g. of methyl mustard oil. After the very vigorous reaction has subsided, the reaction mixture is heated at 80° C. in a vacuum for 1 hour in order to separate the excess of methyl mustard oil. In the residue there remain 56 g. (100% of the theoretical amount) of the above compound in the form of a clear yellow oil.

Under reaction conditions analogous to that described above there are obtained the following compounds:

| Formula | | Physical properties |
|---|---|---|
| 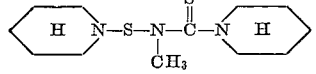 | | Yellow oil. |
| 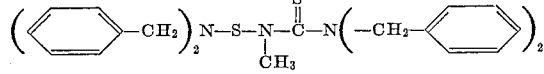 | | Yellow, viscous oil. |
| 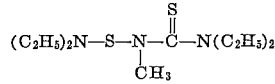 | B.P. $_{0.1}$: 90° C. | Yellow oil. | into a solution of 17.6 g. of bis-diethylamino-monosulphide in 80 ml. of light benzine. The reaction mixture thereby warms up to about 30° C. and there is obtained a green-yellow solution which is stirred for about a further ½ hour at about 60° C. Subsequently, the reaction mixture is evaporated and there are obtained 28 g. of a golden yellow viscous oil which cannot be distilled without decomposition.

*Example 4*

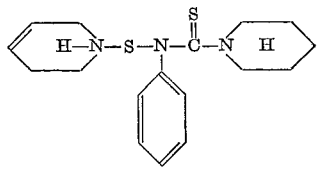

20 g. of dipiperidino-monosulphide are dissolved in 75 ml. of washing benzine and, after the addition of 13.5 g. of phenyl mustard oil the mixture is heated for about one hour at 60–70° C. The yellow clear solution is then evaporated in a vacuum, whereby a pale yellow clear oil is obtained as residue, which, after a few minutes, solidifies as crystals. After recrystallisation from a little petroleum ether, there are obtained pale yellow crystals with a melting point of 70° C. Crude yield: 32 g.=95% of the theoretical.

Calc.: for $C_{17}H_{25}N_3S_2$—C: 60.9%, H: 7.5%, N: 12.5%, S: 19.1%

Found: C: 60.8%, H: 7.7%, N: 12.3%, S: 19.1%

Mice only show symptoms after oral application of 1,000 mg. of the compound per kg. of animal, whilst after subcutanal application of 100 mg. per kg. of mouse only symptoms of poisoning occurred, but no mortality.

*Example 5*

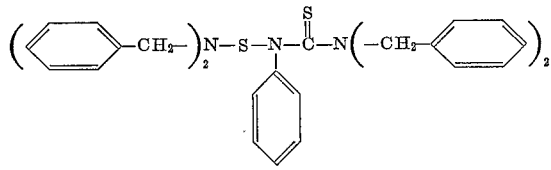

After the addition of 13.5 g. of phenyl mustard oil, a solution of 24.2 bis-dibenzylamino-monosulphide in about 100 ml. of ligroin are heated for about ¼ hour at 50–60° C. Upon cooling the mixture to room temperature, there separates from the pale yellow solution a yellow viscid oil, which after pouring off the mother liquor is evaporated in a vacuum. As distillation residue there is obtained a yellow clear oil in a yield of about 20 g.

*Example 6*

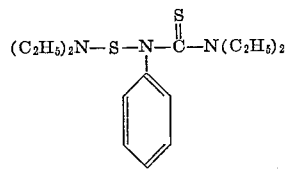

13.5 g. of phenyl mustard oil, dissolved in about 80 ml. of light benzine, are added dropwise, with stirring,

*Example 7*

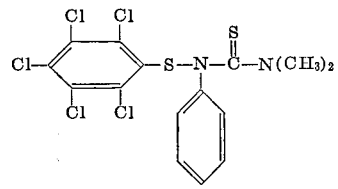

After the addition of 6.8 g. of phenyl mustard oil, 16.3 g. of pentachlorophenyl-sulphenyl-(N,N-dimethyl)-amide dissolved in 50 ml. of washing benzine are heated for about ¼ hour at about 70° C., whereby a clear, orange-red solution results. Upon evaporation of this solution in a vacuum, there remain about 22 g. of egg yellow crystals, which are recrystallised from ethyl acetate. M.P. 98–99° C.

Calc.: for $C_{15}H_{11}N_2S_2Cl_5$—C: 39.1%; H: 2.39%, N: 6.1%, S: 13.9%, Cl: 38.6%

Found: C: 38.8%, H: 2.39%, N: 6.1%, S: 14.1%, Cl: 38.7%

1,000 mg. of the compound per kg. of animal do not effect any symptom if orally administered to mice.

*Example 8*

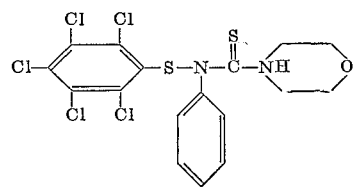

16.4 g. of pentachlorophenyl-sulphenyl-morpholide are suspended in about 100 ml. of toluene and, after the addition of 13.5 g. of phenyl mustard oil, the reaction mixture is heated to boiling with stirring for about 10 minutes. A clear orange-red solution thereby results which is evaporated in a vacuum. The egg yellow crystalline evaporation residue is recrystallised from ethyl acetate thus obtaining yellow crystals which melt at 131° C.

Yield about 30 g.

In the same manner as described above there are obtained the following compounds:

| Formula | Physical properties | |
|---|---|---|
| 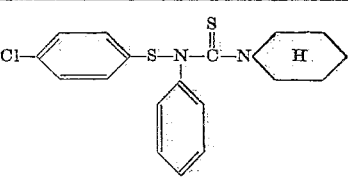 | ---------- | Yellow oil. |
| 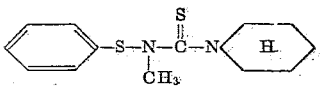 | ---------- | Do. |
| 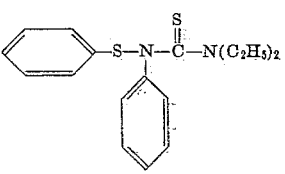 | ---------- | Do. |
| 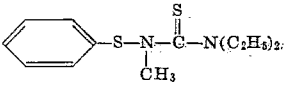 | ---------- | Do. |
| 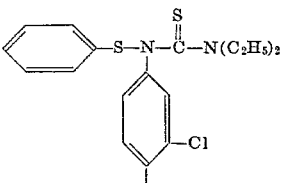 | ---------- | Do. |
| 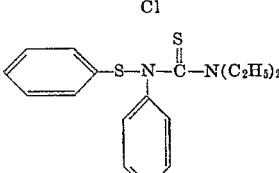 | ---------- | Do. |
| 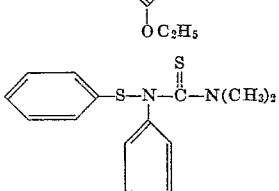 | M.P. 103° C | Yellow crystals. |
| 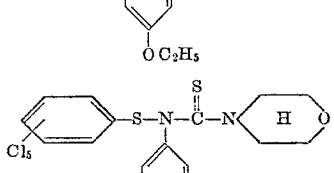 | M.P. 155° C | Do. |
| 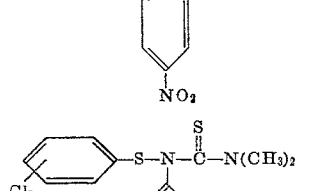 | M.P. 102° C | Do. |

We claim:
1. The compound of the formula

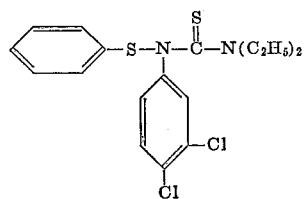

2. The compound of the formula

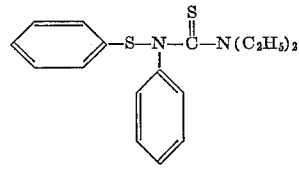

3. The compound of the formula

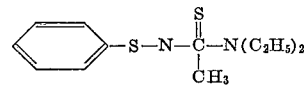

4. A compound having the formula

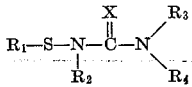

in which $R_2$ is a member selected from the group consisting of a lower alkyl up to 4 carbon atoms, phenyl, halogen substituted phenyl, nitro-substituted phenyl, lower alkoxy substituted phenyl and lower alkyl mercapto substituted phenyl, the lower alkoxy and lower alkyl mercapto in each case having up to 4 carbon atoms; wherein $R_3$ and $R_4$ are members selected from the group consisting of a hydrogen, lower alkyl, phenyl and benzyl; $R_1$ is a member selected from the group consisting of a lower alkyl having up to 4 carbon atoms, phenyl, halogen substituted phenyl; and wherein X stands for a member selected from the group consisting of oxygen and sulfur.

References Cited by the Examiner

UNITED STATES PATENTS

| | | | |
|---|---|---|---|
| 2,343,538 | 3/1944 | Ebelke | 260—247.1 XR |
| 3,084,192 | 4/1963 | Smothers | 260—553 |
| 3,115,524 | 12/1963 | Shapiro et al. | 260—553 |
| 3,119,682 | 1/1964 | Martin | 71—2.6 |
| 3,126,272 | 3/1964 | Fisher et al. | 71—2.7 |

NICHOLAS S. RIZZO, *Primary Examiner.*